United States Patent
Kellner et al.

(10) Patent No.: US 12,504,082 B2
(45) Date of Patent: Dec. 23, 2025

(54) VALVE DEVICE, VALVE HOUSING AND UNIVERSAL VALVE HOUSING

(71) Applicant: Illinois Tool Works Inc., Glenview, IL (US)

(72) Inventors: Manuel Kellner, Alsfeld (DE); Jan Müller, Würzburg (DE); Timo Rohner, Vogtsburg im Kaiserstuhl (DE); Melanie Sindel, Nuremberg (DE); Albert Sbongk, Niederstetten (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/391,151

(22) Filed: Dec. 20, 2023

(65) Prior Publication Data

US 2024/0209952 A1 Jun. 27, 2024

(30) Foreign Application Priority Data

Dec. 23, 2022 (DE) ...................... 10 2022 134 744.3
Dec. 7, 2023 (DE) ...................... 10 2023 134 358.0

(51) Int. Cl.
*F16K 15/14* (2006.01)
*H01M 50/325* (2021.01)

(52) U.S. Cl.
CPC ......... *F16K 15/148* (2013.01); *H01M 50/325* (2021.01)

(58) Field of Classification Search
CPC ........ F16K 15/148; F16K 24/04; F16K 24/06; F16K 27/0209; F16K 27/0236;
(Continued)

(56) References Cited

U.S. PATENT DOCUMENTS 4,352,364 A 10/1982 Orsino
9,997,807 B2 * 6/2018 Fegely .................... F16L 15/08
(Continued)

FOREIGN PATENT DOCUMENTS

CN 113685591 A * 11/2021
DE 3934687 C1 3/1991
(Continued)

OTHER PUBLICATIONS

Machine English Translation of DE102012202103 (Year: 2025).*
(Continued)

*Primary Examiner* — Hailey K. Do
(74) *Attorney, Agent, or Firm* — McAndrews, Held & Malloy, Ltd.

(57) ABSTRACT

Disclosed is a valve apparatus having a first pressure compensation valve, a first, gas-tight, cap-like membrane device, and a gas-permeable, moisture-permeable, and yet water-impermeable second membrane device. The first pressure compensation valve, in particular a back-pressure valve, having a first valve housing, which limits a pressure compensation opening and comprising a housing side and a covering side, comprising or consisting of a first, gas-tight, cap-like membrane device covering a first pressure compensation opening and releasing the first pressure compensation opening from a predetermined negative pressure prevailing on the housing side in order to enable a pressure compensation between a housing device and an environment, and a gas-permeable, moisture-permeable, and yet water-impermeable second membrane device arranged on the covering side and in series to the first membrane device, covering a second pressure compensation opening and preventing water entry into the valve housing and thus into a housing device.

19 Claims, 5 Drawing Sheets

(58) Field of Classification Search
CPC ... H01M 50/325; B65D 77/225; B65D 83/70; B65D 90/34; B65D 51/1644
See application file for complete search history.

(56) References Cited

U.S. PATENT DOCUMENTS

| | | | | |
|---|---|---|---|---|
| 10,018,280 | B2 * | 7/2018 | Xia | F16K 15/202 |
| 10,529,969 | B2 * | 1/2020 | Ogawa | H01M 50/24 |
| 11,560,962 | B2 * | 1/2023 | Nakayama | H01M 50/317 |

FOREIGN PATENT DOCUMENTS

| | | | | | |
|---|---|---|---|---|---|
| DE | 102012202103 | A1 * | 8/2013 | | H05K 5/0213 |
| DE | 102020130036 | A1 * | 5/2021 | | F16K 15/148 |
| EP | 0222447 | A1 | 5/1987 | | |
| EP | 0504573 | | 9/1992 | | |
| EP | 0554535 | A1 | 8/1993 | | |
| EP | 0588823 | A1 | 3/1994 | | |
| EP | 0638944 | A1 | 2/1995 | | |
| EP | 0756338 | A1 | 1/1997 | | |
| EP | 0920063 | A1 | 6/1999 | | |
| EP | 1001905 | A1 | 5/2000 | | |
| EP | 0875949 | B1 | 3/2003 | | |
| EP | 1717884 | A1 | 11/2006 | | |
| FR | 2551172 | | 3/1985 | | |
| FR | 2576149 | | 7/1986 | | |
| FR | 2674376 | | 9/1992 | | |
| GB | 567824 | | 3/1945 | | |
| GB | 2267550 | A * | 12/1993 | | A62B 9/02 |
| WO | WO-03060362 | A1 * | 7/2003 | | B65D 90/34 |

OTHER PUBLICATIONS

Machine English Translation of DE102020130036 (Year: 2025).*
Machine English translation of CN_113685591_A (Year: 2025).*
Machine English translation of WO_03060362_A1 (Year: 2025).*

* cited by examiner

VALVE DEVICE, VALVE HOUSING AND UNIVERSAL VALVE HOUSING

RELATED APPLICATIONS

The present application claims the benefit of German Patent Application Nos. DE 10 2022 134 744.3, filed Dec. 23, 2022, and DE 10 2023 134 358.0, filed Dec. 7, 2023, each titled "Valve Device, Valve Housing and Universal Valve Housing," the contents of which are hereby incorporated by reference.

BACKGROUND

Pressure relief valves protect pressurized spaces or pressure containers against a pressure increase that is impermissible for a pressure device or a pressure system. If the response pressure is exceeded, gases, vapors or liquids are discharged into the atmosphere or into collecting pipes.

The pressure relief valve is a pressure relief means that begins to respond when the pressure exceeds the maximum allowable operating pressure in case of foreseeable disruptions. When an excess pressure is reached, e.g. 10% of the maximum allowable operating pressure, the safety valve must be fully open. If the safety valve is dimensioned properly, the pressure build-up remains manageable. After the excess pressure has been relieved by blowing off into the environment, the valve may close again, and the system can continue to be operated.

Pressure relief valves are also installed in battery housings for batteries, in particular for high-voltage batteries, for example in electric vehicles.

EP 1 717 884 A1 describes a degassing valve for acid batteries. It comprises a substantially cylindrical plug part, which is configured for engaging with a cell opening of the acid battery and which comprises at least one passage opening connecting the cell interior of the acid battery to the surrounding atmosphere, wherein a valve arrangement is provided in the passage opening that communicates with the cell interior and is connected to the surrounding atmosphere. In order to provide a degassing valve for an acid battery, in particular an acid battery with a defined electrolyte, which is simple and inexpensive to produce and provides improved protection against the leakage of battery acid, it is proposed according to the disclosure that at least one swirl chamber adjoins the passage opening of the plug part in the direction of the cell interior and that a gas-permeable filter unit adjoins the swirl chamber.

EP 0 638 944 A1 describes a sealing plug for a lead accumulator, which is intended to prevent the leakage of acid mist from the cell and also rule out the damaging influence of the acid on the function of a safety valve provided in the sealing plug. The sealing plug comprises a microporous frit and a pressure relief valve in a housing that is sealed against the cell lid in the electrolyte filling opening.

DE 39 34 687 C1 discloses a closed, maintenance-free accumulator that can be used in a standing and prone position with a fixed electrolyte. In the lid of the accumulator housing, a filling opening is provided with a pressure relief valve. A projection to the inside of the housing is provided at the through-opening, from which a pipe extends parallel to the lid wall and opens into the gas space in the upper region of the accumulator. The path of gas exiting the accumulator thus leads through the pipe to the projection in the housing lid and then outwardly through the pressure relief valve.

Further degassing valves and sealing plugs for accumulators are described in the following publications: EP 0 920 063 A1, EP 0 756 338 A1, FR 2 576 149, EP 0 588 823 A1, GB 567 824, EP 1 001 905 A1, EP 0 875 949 B1, EP 0 588 823 A1, U.S. Pat. No. 4,352,364, FR 2 674 376, FR 2 551 172, EP 0 554, 535 A1, EP 0 504 573, and EP 0 222 447 A1.

Therefore, despite advancements, a need exists for an improved valve apparatus, a valve housing, and a universal valve housing.

SUMMARY

The present disclosure relates generally to a valve apparatus, a valve housing, and a universal valve housing, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The problem addressed by the present disclosure is to provide a valve apparatus, a valve housing, and a universal valve housing that are simple to construct and inexpensive to manufacture.

A further problem addressed by the present disclosure is to provide a valve apparatus, a valve housing, and a universal valve housing, which represent an alternative to apparatuses known in the prior art.

A further problem addressed by the present disclosure is to provide a valve apparatus, a valve housing, and a universal valve housing that are safe and reliable in operation.

According to the disclosure, a valve apparatus is provided. It comprises a first valve, preferably an emergency degassing valve or a pressure compensation valve, in particular a back-pressure valve, having a first valve housing, which limits a pressure compensation opening and comprising a housing side and a covering side, comprising or consisting of a first, gas-tight, cap-like membrane device covering a first pressure compensation opening and releasing the first pressure compensation opening from a predetermined negative pressure prevailing on the housing side in order to enable a pressure compensation between a housing device and an environment, and a water-impermeable second membrane device arranged on the covering side and in series to the first membrane device, covering a second pressure compensation opening and preventing water entry into the valve housing and thus into a housing device.

According to the present disclosure, a simple valve apparatus is thus provided, comprising a first pressure compensation valve, in particular a back-pressure valve having a first membrane device. The first membrane device is preferably formed from silicone.

With a negative pressure of at least 20 mbar or at least 30 mbar or at least 40 mbar prevailing on the valve apparatus or in a housing device, a back pressure is generated, and a negative pressure prevailing in the housing device can be reduced. Accordingly, the first membrane device can be used as a back-pressure or threshold pressure membrane.

The second membrane apparatus is preferably configured as a PTFE membrane.

By providing such a PTFE membrane that is gas- and moisture-permeable and water impermeable, water penetration into a housing device equipped with the valve apparatus is safely and reliably prevented. It is nonetheless possible to remove moisture via this membrane device.

The valve housing of the valve apparatus can be formed from a base element and a lid element, wherein the base element and the lid element are connected to one another via a threaded connection. This will be explained in further detail in the following. By providing the second membrane device or the PTFE membrane, a sealing of the thread to the threaded connection between the base element and the lid element is no longer necessary, because the PTFE membrane forms a water barrier.

By providing a first silicone membrane device arranged in series as a back-pressure membrane and a second membrane device or a PTFE membrane, an increased pressure level is achieved that limits a permanent compensation of a negative pressure in a housing device.

Compared to an emergency degassing valve apparatus disclosed in the yet unpublished DE 10 2022 108 771.9, the valve apparatus according to the disclosure has the advantage that individual functions of the emergency degassing valve apparatus have been separated. In this way, simplification has been facilitated by functional separation of the components of such an emergency degassing valve apparatus.

The pressure compensation valve fulfills the highest sealing requirements in accordance with IPX6K/9K.

In particular, the valve apparatus according to the disclosure represents a simply constructed pressure compensation valve that is safe and reliable in operation.

According to a further aspect of the present disclosure, the valve apparatus can further comprise: the housing device, in particular for a battery of an electric vehicle or a power electronics, preferably for a motor vehicle, a pressure relief valve, in particular a second pressure compensation valve, having a second valve housing with a housing side and a covering side, comprising or consisting of a third, cap-like, gas-tight membrane device covering a pressure compensation opening and releasing the pressure compensation opening at a predetermined positive pressure prevailing on the housing side in order to reduce a positive pressure prevailing on the housing side in the housing apparatus.

Such a valve apparatus according to the present disclosure can also be referred to as a housing device and thus comprises two valves that enable pressure compensation and, if necessary, a discharge of liquid from battery housings or housings of the power electronics.

As soon as a positive pressure prevails in the housing device, the third membrane device opens so that this positive pressure can be removed from the housing device.

This pressure relief valve is preferably also configured so as to remove water from the housing device and can therefore have a corresponding water drain.

In this way, condensation water can also be discharged from the housing device in the event of a predetermined positive pressure and/or a predetermined water column.

Preferably, the pressure relief valve opens at a pressure of 4 mbar or a water column of 4 mm.

This pressure relief valve of the valve apparatus also fulfills high sealing requirements in accordance with IPX6K/9K.

The technical effect of the valve apparatus according to the disclosure is similar to the technical effect of the emergency degassing valve apparatus described in the as yet unpublished DE 10 2022 108 771.9.

However, by contrast to this, the present disclosure is of much simpler construction, because the two valve functions have been separated from one another. With respect to the technical effect of the pressure compensation valve and the pressure relief valve, reference is made in full to this document.

By providing a valve apparatus according to the disclosure with two pressure compensation valves (positive and negative pressure) forming a double check valve, a pressure compensation in a space to be degassed, in particular in a housing device, in both directions is possible, which means that both a positive pressure and a negative pressure in the space to be degassed can be compensated.

The second membrane device of the first pressure compensation valve is in particular a gas permeable protective membrane connected to a lid of the valve housing.

A support structure for mechanically stabilizing the protective membrane can be provided.

By providing a support structure, the mechanical stability of the protective membrane is significantly increased and protected against damage.

Thus, the valve apparatus according to the disclosure forms a ventilation system with two pressure compensation valves, which are arranged separately or independently or spatially separately from one another on a housing device, wherein the second pressure compensation valve or the pressure relief valve can be configured so as to discharge water from the housing device.

According to a further advantageous aspect of the valve apparatus according to the disclosure, the housing device can preferably comprise a bottom wall extending in an approximately horizontal direction, in which the pressure relief valve or the second pressure compensation valve is arranged, preferably in a lowest region of the bottom wall, a ceiling wall preferably extending in the horizontal direction, and at least one side wall preferably extending in the vertical direction and joining the bottom wall with the ceiling wall, wherein the pressure compensation valve is arranged in the side wall and thus preferably offset by 90° to the pressure relief valve and/or in the ceiling wall and thus preferably offset by 180° to the pressure relief valve.

An arrangement of the pressure compensation valve being offset by 90° or 180° in relation to the pressure relief valve allows for a particularly advantageous structural and functional separation of the two valves, which are preferably used in a housing device for batteries of electric vehicles and/or in a housing device for power electronics of motor vehicles.

According to a further aspect of the present disclosure, the first and the second valve housing are formed from like, and in particular identical, components, apart from the respective membrane device. By using the same parts for both valves, in particular a lid and a base element, the number of different parts for such a valve apparatus can be significantly reduced. In this way, the valve apparatus according to the disclosure can be manufactured at a substantially lower cost and is simpler in construction.

Instead of the aforementioned membrane devices, other valves or valve apparatuses can be formed in this manner. Different closure bodies or membranes can be arranged in the valve housing or in a lid and/or a base element of such a valve apparatus. These can be, for example, pressure compensation valves, pressure relief valves, negative pressure valves, drainage valves, or back-pressure valves.

Such valve apparatuses then only differ by having different membrane or closure body configurations and always have a valve housing that is identical in design.

According to a further aspect of the present disclosure, a valve housing is provided, in particular for a valve apparatus as described above. It comprises a base element for insertion into a passage opening of a component, in particular a housing device, wherein the base element comprises a first fastening portion in which at least one bayonet-like fastening means is configured for retentive abutment on an edge region of a first component surface of the component, and a rotary element arranged on the base element, having a second fastening portion, in which an abutting means for retentive abutment on a second component surface of a component or a housing device is configured, and wherein the base element and the rotary element are rotatably and axially slidably coupled to one another by means of a threaded axial displacement device, wherein the base element and/or the rotary element limit a gas passage opening.

In particular, one of the aforementioned membrane devices is arranged in such a valve housing in order to form either the pressure compensation valve or the back-pressure valve or the second pressure compensation valve or the pressure relief valve.

By providing a corresponding bayonet-type fastening means, such a valve apparatus can be introduced into and connected to housing devices of different wall thickness. In this way, a very high tolerance range is achieved for different wall thicknesses of components, in particular of housing devices, so that the same valve apparatus can be used for differently thick components. This significantly reduces manufacturing and storage costs.

A fastening apparatus configured similar to the valve housing according to the disclosure is disclosed in the commonly-owned and not-yet-unpublished patent application DE 10 2022 105 564.7, wherein reference is made in full to the technical effects of the individual components of this fastening apparatus in relation to the valve housing according to the disclosure. The same applies to a corresponding method for connecting the valve housing to the housing device or the fastening apparatus to a component.

The valve housing also differs from the fastening apparatus in that the base element can have an internal radially circumferential flange portion, which forms a sealing portion for a membrane device, and wherein struts extending radially inwardly are molded on the flange portion and form in the center a receiving element or a receiving recess for receiving a membrane device, and preferably wherein the rotary element, in particular on the inside, comprises a tubular portion for forming a membrane device, in particular a protective membrane.

Preferably, the valve housing is provided for insertion into a contoured passage opening of a component or a housing device for a battery, in particular an electric vehicle or a housing device for a power electronics.

In the context of the present disclosure, a contoured passage opening is understood to mean a passage opening at whose edge region at least two or preferably three or four or five contour elements or lobes are molded, which extend radially inwardly and in particular are equally spaced apart from one another. The passage opening can thus have a shape that deviates from a circular surface or is not circular or not completely circular.

Due to the fact that the base element comprises a first fastening portion with bayonet-like fastening means and the rotary element comprises a second fastening portion with at least one abutting means and the base element and the rotary element are rotatably and axially slidably coupled to one another by means of the threaded axial displacement device, the base element and the rotary element can be mounted on both sides or both component surfaces of a component adjacent to a contoured passage opening and connected to one another via the axial displacement device.

The axial displacement device can fixedly connect the base element and the rotary element or the bayonet-like fastening means and the abutting means to one another at different distances corresponding to the thickness of a component. In this way, the valve housing can be connected to components of different thicknesses or can be fastened to components of different thicknesses.

In the context of the present disclosure, a first component surface, for example an outer side of a wall of a component or a housing device, and the second component surface can be an inner side of a wall of a component or a housing device, or vice versa. This means that a first and a second component surface are oriented opposite to one another or their surfaces face in opposite directions.

The base element can be approximately tubular, with or without a passage opening. The rotary element can be shaped like a bowl, with or without a passage opening.

The abutting means arranged in the second fastening portion of the rotary element for retentive abutment on a second component surface of a component can preferably be configured as a radially circumferential, circular-annular abutting portion.

The bayonet-like fastening means of the base element comprises one or two or preferably three or also four radially circumferentially arranged and in particular equally spaced apart retaining means for retentive abutment on contour elements of a first component surface of a component.

In addition, the base element comprises one or more rotation-limiting stops extending in an axial direction, which cooperate with a contour element of a component such that a predetermined rotational movement of the base element is limited, wherein the base element and the rotary element thereafter move together in the axial direction for retentive abutment on a component.

The retaining means of the bayonet-like fastening means are set into a rotational movement via a rotational movement of the rotary element, which is transferred to the base element, and in doing so, rearwardly engage with the contour elements of a component by their retaining means.

In this way, the ramp-like retaining means retentively abut the contour elements.

A rotational movement of the rotary element is transferred to the base element until the rotation-limiting stops of the base element extending in the axial direction hit edges of the contour elements of a component so that the rotational movement is stopped.

This rotational movement up to hitting the rotation-limiting stops of the base element at the edges of the contour elements of a component depends on the thickness of a corresponding component. The thinner the component, the larger the turning angle, and the thicker the component, the smaller the turning angle. The turning angle is, for example, a quarter or third or half rotation in the direction of rotation around an axial or longitudinal axis. This means a rotation about a turning angle of, for example, 20° or 30° or 45° or 60° or 75° or 90° or 120° or 150°.

The base element is now moved in the axial direction in the direction of the rotary element or towards the same by a further rotational movement of the rotary element in a rotational direction about the axial axis.

Preferably, the rotation-limiting stops can be an integral component of the ramp elements or integrally molded thereon.

A frictional resistance can exist between the base element and the rotary element such that the base element can be rotated about the axial axis by a rotational movement of the base element until the limiting stops of the base element hit contour elements of a passage opening of a component.

By providing a corresponding frictional resistance in the region in which the base element and the rotary element are coupled to one another, a rotational movement in a rotational direction can be transferred from the rotary element to the base element so that it is moved together with the rotary element in the rotational direction. In this case, it is not necessarily provided that the base element moves in the same direction of rotation or moves synchronously with the rotary element. It is only important that the frictional resistance in the coupling range between the rotary element and the base element is sufficiently large such that the base element is rotated by the rotary element, even if it is a type of towing rotation, or the like.

According to a first exemplary embodiment, the threaded axial displacement device can comprise an outer threading of the base element and an inner threading of the rotary element that is engaged with the outer threading of the base element, wherein this threaded connection then also generates the necessary frictional resistance.

According to a second exemplary embodiment, the thread-like axial displacement device comprises first ramp elements of the base element and correspondingly configured second ramp elements of the rotary element, wherein frictional resistance contours are provided between the base element and the rotary element in order to generate the frictional resistance.

In this case, corresponding first ramp surfaces of the first ramp elements and correspondingly configured second ramp surfaces of the second ramp elements are technically equivalent to the threaded connection of the first exemplary embodiment. They can then form a multi-start threading, for example a three-start threading.

The frictional resistance contours can, for example, be configured as a knurling configured radially circumferential on an outer sheath wall of the base element or as structures extending in an axial direction. Additionally and/or alternatively, a corresponding knurling or structures extending in the axial direction can also be configured on radially inwardly facing surfaces of the second ramp elements of the rotary element.

An axial stop device can be configured between the base element and the rotary element, which prevents the base element and the rotary element from moving towards one another upon insertion of the valve housing into a passage opening of a component.

The axial stop device ensures that, in a valve housing according to the second exemplary embodiment, the base element does not slide in the axial direction in the direction of the rotary element and does not move towards it when the base element is introduced into a contoured passage opening of a component and hits there, for example on a contour element or an edge of the component delimiting the passage opening.

Furthermore, according to the first exemplary embodiment, it can be provided that the base element has a tubular insertion portion at a region opposite the rotary element, wherein a free end of this tubular portion is conically tapered so as to facilitate insertion of the valve housing into a contoured passage opening of a component or a housing device.

According to the first exemplary embodiment, the axial stop mechanism can be configured by means of thread starts of the threaded connection between the base element and the rotary element. According to the first exemplary embodiment, the axial stop device is thus an integral component of the axial displacement device, which connects the base element and the rotary element to one another.

According to the second exemplary embodiment, it is provided that the axial stop device is configured by surfaces of ramp-like stop elements of the rotary element, said surfaces extending orthogonally to the axial direction, and by surfaces of the first ramp element of the base element, said surfaces extending orthogonally to the axial direction.

Furthermore, the ramp-like stop elements and the second ramp elements according to the second exemplary embodiment are respectively radially circumferentially and equidistantly molded to one another at end regions of an inner sheath wall of the tubular rotary element, said ends being opposite to one another in the axial direction, and arranged offset from one another in the axial direction.

Also according to the second exemplary embodiment, the retaining means of the bayonet-like fastening means and the first ramp elements of the base element can be configured radially circumferentially and equally spaced relative to one another at opposite end regions of an outer sheath wall of the tubular base element and arranged so as to be flush with one another in an axial direction.

The above construction or structure facilitates the technical function or the fastening process of the individual technical features of the present disclosure.

The abutting portion of the abutting means can have a radially circumferential sealing element with a sealing lip, or a separate sealing element can also be provided so that the rotary element can sealingly abut a second component surface of a component.

Preferably, the valve housing is manufactured from a plastic by means of an injection molding process.

Furthermore, the valve housing is in particular configured so as to be inserted into a contoured passage opening of a housing device.

Preferably, one or two or preferably three or also four contour elements extending radially inwardly can be configured radially and circumferentially and equally spaced apart from one another along the passage opening of the housing device.

Furthermore, the valve housing on the second fastening portion can comprise a radially circumferential sealing device for sealingly abutting a space to be degassed.

The valve housing or the base body and the rotary element can be formed from a plastic, such as PA6 or PA60 or VO, with at least 30 percent recyclate content.

According to a further aspect of the present disclosure, a universal valve housing is provided, in particular a valve housing described above. This is wherein the valve housing is a universal housing suitable for receiving various membranes or closure bodies and configured so as to form different valves.

The concept is similar to the aspect described above, according to which the first pressure compensation valve and the pressure relief valve use the same valve housing. According to the universal housing, however, an arbitrarily configured valve housing is provided here, wherein the above configuration of the valve housing with the base and rotary element merely represent one exemplary embodiment, which is suitable for receiving and forming a wide variety of valves and thus allows for a considerable reduction in production costs.

The various aspects of a valve apparatus 35, a valve housing 1, and a universal valve housing (not shown) according to the disclosure as discussed in the introduction to the specification are described below with reference to exemplary embodiments (FIGS. 1 to 21).

With regard to the configuration of the valve housing 1, in particular, reference is made to the yet unpublished German patent application bearing the application number DE 10 2022 105 564.7, which is hereby cited in full. The valve housing 1 comprises analogous technical features of the fastening apparatus. Identical components bear the same reference numerals.

The valve housing 1 differs from the fastening apparatus described in the yet unpublished patent application in that the lid element 6 also has a passage opening, in particular a pressure compensation opening 36.

In the following, the valve housing 1 is first explained in further detail on the basis of the fastening apparatus described in the yet unpublished German patent application bearing the application number DE 10 2022 105 564.7 (FIGS. 5 to 21), which is hereby incorporated by reference. Subsequently, the differences between the fastening apparatus and the valve housing 1 will be explained.

The valve housing 1 is wherein it can be connected to components or housing devices 2 of different thicknesses and can therefore be used flexibly for different component thicknesses.

Figure 8:
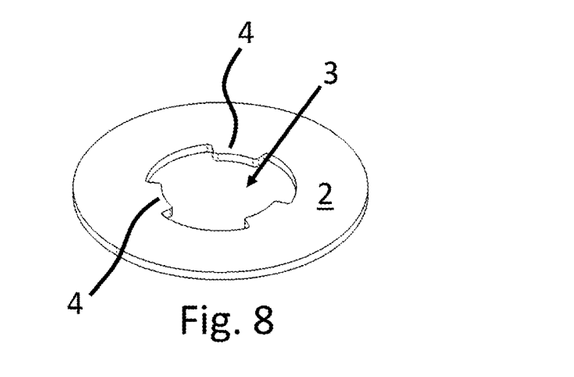
FIG. 8 illustrates a perspective view of a region of a component or a housing device having a contoured passage opening with contour elements.

A corresponding component, in particular a housing device 2, comprises a contoured passage opening 3 having contour elements 4 extending in the radial direction.

Figure 5:
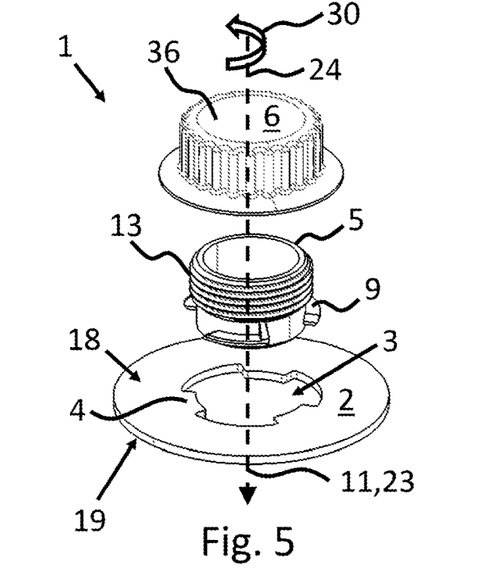
FIG. 5 illustrates a perspective exploded view of a fastening apparatus according to the disclosure according to a first exemplary embodiment.

The valve housing 1 is configured in two parts according to this exemplary embodiment and comprises a base element 5 and a rotary element 6.

The base element 5 and the rotary element 6 are rotatably and axially slidably coupled to one another by means of a threaded axial displacement device 35.

Figure 7:
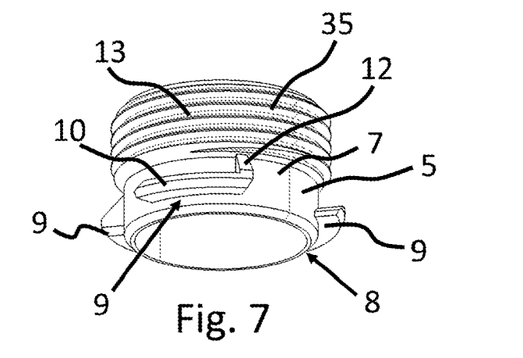
FIG. 7 illustrates a perspective view of a base element of the valve housing.

The base element 5 is approximately tubular and has three bayonet-like fastening means 9 which are radially circumferential and equally spaced apart on an outer sheath wall 7 of the base element at an axial end region, which is hereinafter referred to as the first fastening portion 8.

The bayonet-like fastening means 9 comprise retaining means 10, wherein the retaining means 10 are configured as retaining portions extending in the radial direction outwardly. The retaining portions of the retaining means 10 extend approximately orthogonally to an axial direction 11.

Rotation-limiting stops 12 extending in the axial direction are configured on the retaining means 10.

In the axial direction 11, opposite the bayonet-like fastening means 9, an outer threading 13 is integrally configured on the outer sheath wall 7 of the base element 5.

Figure 6:
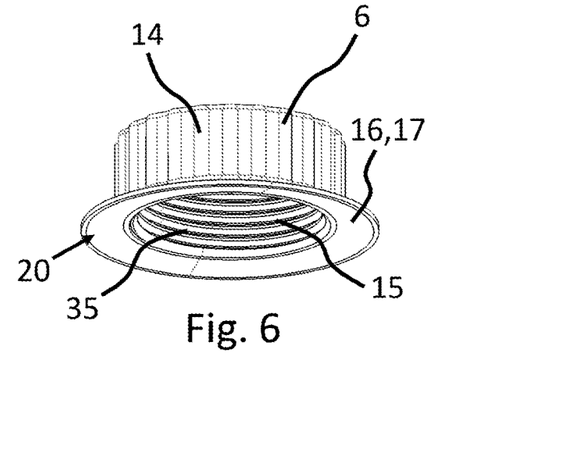
FIG. 6 illustrates a perspective view of a rotary element of the valve housing.

The rotary element 6 is approximately bowl-shaped and comprises a tubular portion 14.

A knurling is configured on an outer sheath wall of the tubular portion in order to be able to manually more easily set the rotary element 6 into a rotational movement.

In the tubular portion 14, an inner threading 15 is configured on an inner sheath wall 28 of the cover element 6, corresponding to the outer threading 13 of the base element 5.

Furthermore, the lid element 6 comprises abutting means 16 for retentive abutment on a second component surface 18 of a component 2. The abutting means 16 is configured as a circular-annular radially circumferential abutting portion 17.

In order to sealingly abut a second component surface 18, a sealing lip configured by a two-component injection molding method can be provided on the abutting portion 17. Alternatively, a corresponding sealing ring can also be provided.

The region in which the abutting means 16 is integrally configured with the rotary element is referred to as the second fastening portion 20.

In addition, an axial end region is provided on the base element 5 adjacent to the bayonet-like fastening means 9 as an annular portion 21. A free end of this annular portion has a conically tapering insertion portion 22.

The base element 5 comprises a radially circumferential flange portion 37 internally or in the region of the pressure compensation opening 36. The flange portion 37 forms a sealing portion 38 for a membrane device.

Radially inwardly extending struts 39 are molded on the flange portion 37. These struts 39 form in the center a circular-annular receiving recess 43 or a receiving element for receiving a membrane device.

Figure 1:
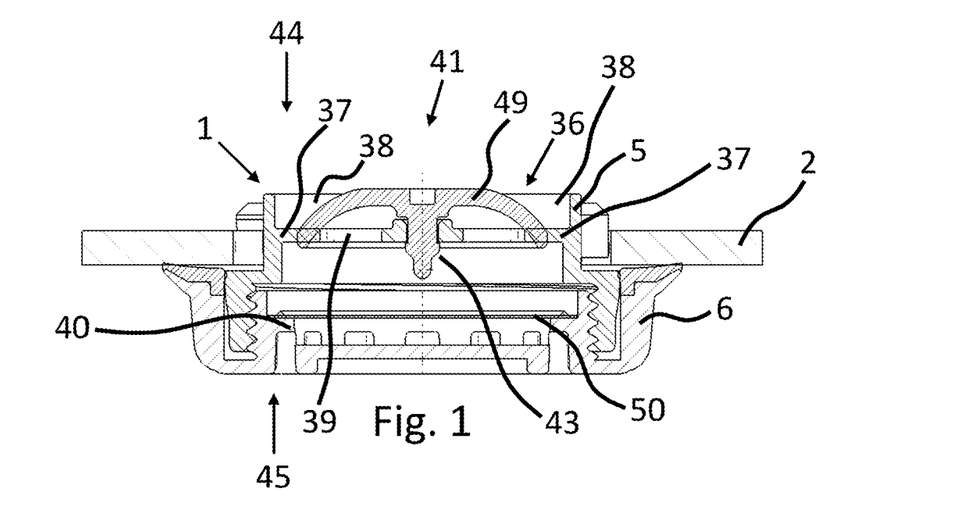
FIG. 1 illustrates a schematic side-cut view of a first pressure compensation valve or a back-pressure or negative-pressure valve of a valve apparatus according to the disclosure.
Figure 4:
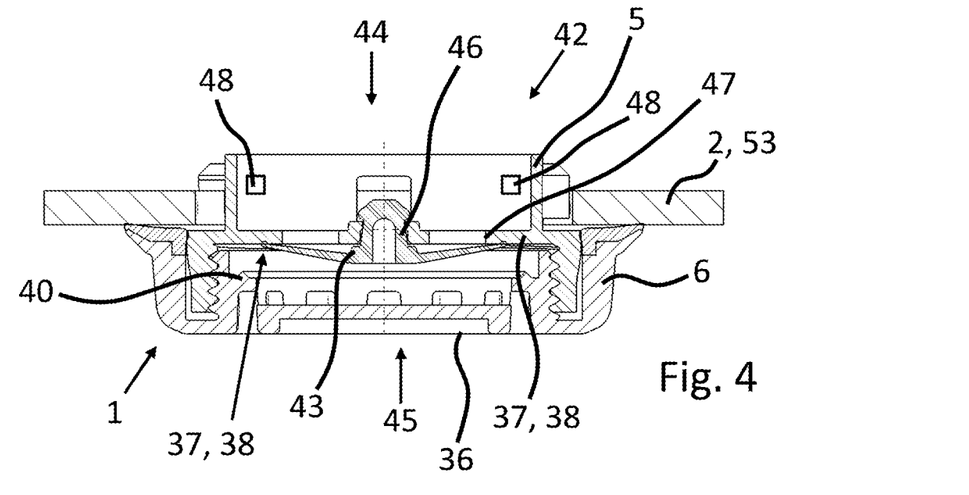
FIG. 4 illustrates a schematically cut lateral view of a pressure relief valve or a second pressure compensation valve of the valve apparatus according to the disclosure.

On the rotary element 6, a tubular portion 40 for forming a membrane device, in particular a protective membrane, is configured on the inside or in the region of the pressure compensation opening 36. The valve apparatus 35 according to the disclosure comprises a housing device 2, wherein a first pressure compensation valve or a back-pressure valve 41 and a second pressure compensation valve or a pressure relief valve 42 are arranged in the housing device 2.

Figure 2:
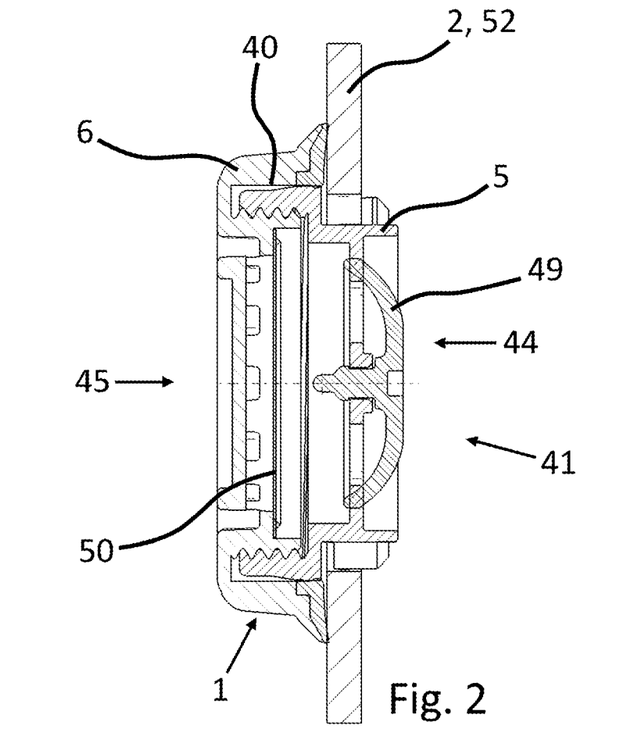
FIG. 2 illustrates a vertical arrangement of the first pressure compensation valve in a housing device (not shown).
Figure 3:
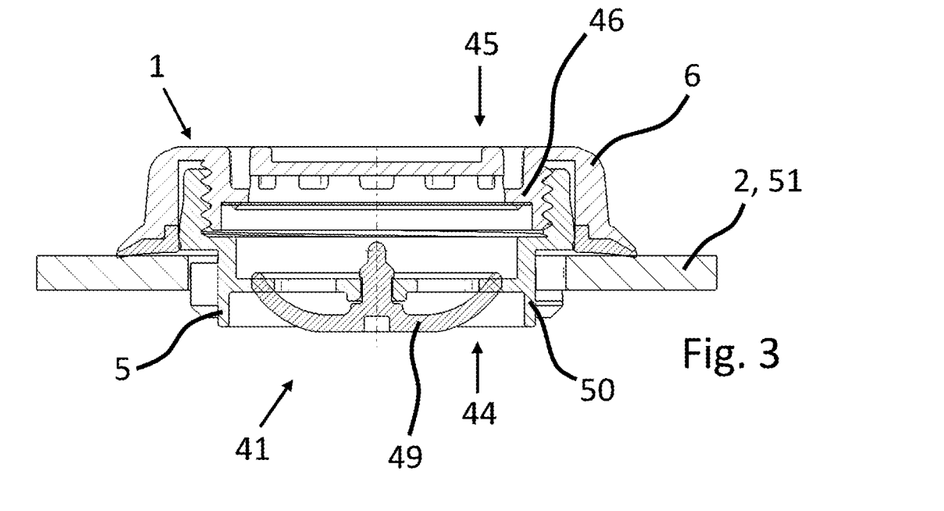
FIG. 3 illustrates a horizontal arrangement of the first pressure compensation valve in a housing device (not shown).

The housing device 2 comprises a bottom wall 53, which extends approximately horizontally, in which the pressure relief valve or a second pressure compensation valve 42 is arranged, in particular in a lowest region of the bottom wall.

Furthermore, the housing device 2 comprises a ceiling wall 51 preferably extending in the horizontal direction and at least one side wall 52 preferably extending in vertical direction and connecting the bottom wall and the ceiling wall to one another.

The first pressure compensation valve 41 can be arranged in the side wall 52 and thus preferably offset by 90° to the pressure relief valve 42 and/or in the ceiling wall 51 and thus preferably offset by 180° to the pressure relief valve 42.

The pressure relief valve or the second pressure compensation valve 42 arranged in the bottom wall 53 comprises the valve housing 1 described in detail above.

The valve housing 1 comprises a housing side 44 facing towards the housing device 2 and a covering side 45 lying opposite the housing side.

In the region of the gas passage opening 36, a third membrane device 46 is arranged in the receiving recess 43.

The third membrane device 46 is cap-like and is formed from silicone and abuts a sealing portion 38 of the flange portion 37 facing towards the covering side 45.

Furthermore, the pressure relief valve or second pressure compensation valve 42 comprises a water drain 47. The water drain 47 is formed by radially circumferentially arranged passage openings 48 arranged in the base element 5.

By opening the third membrane device 46 with a corresponding positive pressure prevailing in the housing device 2, water can thus drain from the housing device 2.

The back-pressure valve or the first pressure compensation valve 41 also uses a constructively identical valve housing 1. In this valve housing 1, a first membrane device 49 is arranged in the receiving recess 43 of the base element 5.

The first membrane device 49 is arranged in the region of the housing side 44 of the valve housing 1 and opens from a predetermined negative pressure prevailing in the housing device 2. Like the third membrane device 46, the first membrane device 49 is preferably formed from silicone in a cap-like manner.

Furthermore, the first pressure compensation valve 41 provides that a second membrane device 50 is molded on the tubular portion 40 in the region of the housing side 44. The second membrane apparatus 50 is configured as a PTFE membrane.

In the following, a method for connecting the valve housing 1 according to the first exemplary embodiment to a component 2, in particular a housing device 2 or a contoured passage opening 3 of a component 2, in particular a housing device 2, is described.

Figure 9:
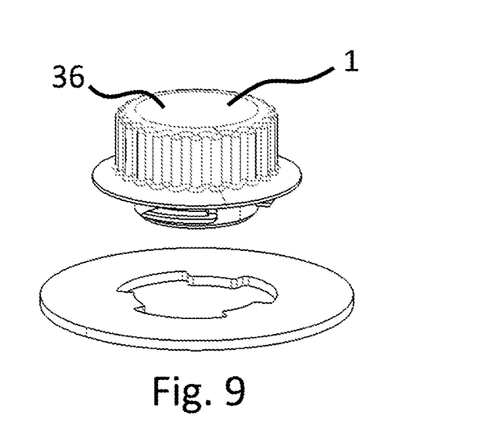
FIG. 9 illustrates a perspective view of the valve housing with the component or with the housing device.
Figure 11:
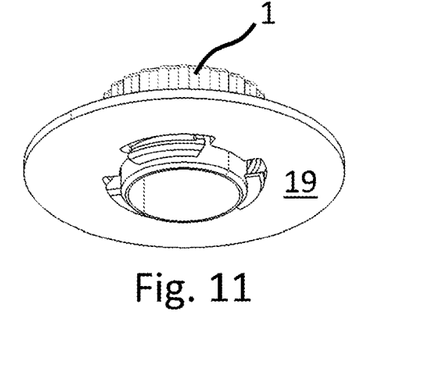
FIG. 11 illustrates a perspective view of the valve housing in a state of being not fixed to a component or a housing device.

First, the base element 5 of the valve housing 1 is inserted with a screwed-on rotary element 6 in the axial direction 11 into the contoured passage opening 3 of the component 2, wherein the bayonet-like fastening means 9 are arranged in the region between two adjacent contour elements 4 of the contoured passage opening 3.

A movement in the axial direction 11 corresponds to a movement in an assembly direction 23. In the context of the present disclosure, the assembly direction 23 is defined as a direction in which the valve housing 1 is inserted into a passage opening 3 of a component 2, wherein this direction extends orthogonally to a component surface 18 delimiting a passage opening 3.

As soon as the abutment portion 17 of the rotary element 6 abuts the second component surface 18 by the movement in the axial direction 11, the rotary element 6 is manually set into a rotational movement about an axial axis 24.

First, the base element 5 coupled to the rotary element via the corresponding threaded connection 15, 13 with the rotary element is set into a rotational movement.

Figure 10:
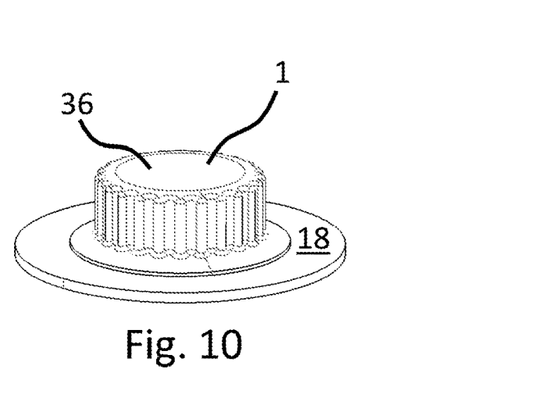
FIG. 10 illustrates a perspective view of the valve housing in a state of being arranged in a final assembly position in a component or a housing device.

The retaining means 10 of the bayonet-like fastening means 9 thereby abut the contour elements 4 of the contoured passage opening 3.

The rotational movement is continued until the rotation-limiting stops 12 of the base element 5 hit the contour elements 4. Thus, the rotational movement of the base element is limited.

Figure 12:
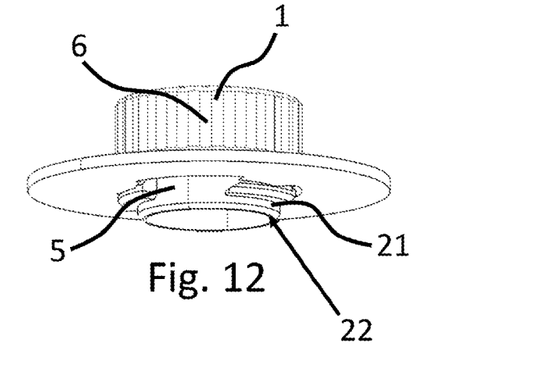
FIG. 12 illustrates a perspective view of the valve housing in a state of being mounted on a component or a housing device.
Figure 13:
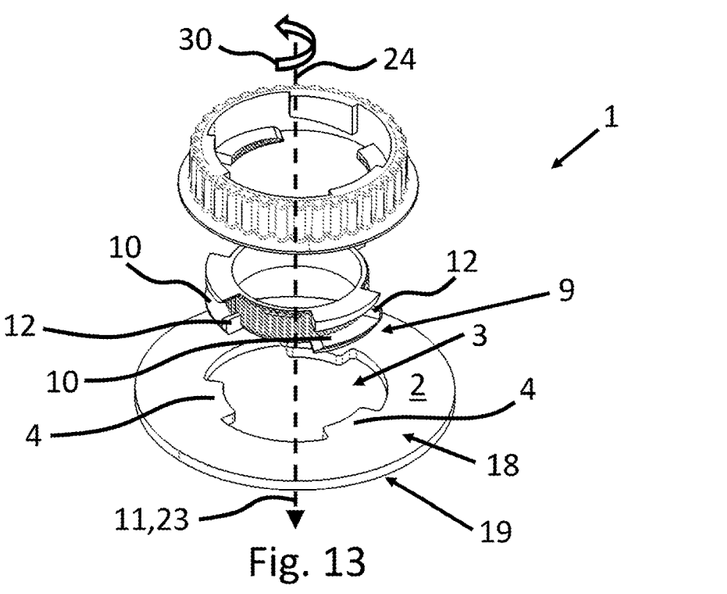
FIG. 13 illustrates a perspective exploded view of a valve housing according to the disclosure according to a second exemplary embodiment.

The rotary element 6 is further subjected to rotational movement and moves through the threaded connection 13, 15 towards the second component surface 18, until the abutting portion 17 of the abutting means 16 hits the second component surface.

The valve housing is now securely and reliably connected to a component.

In the following, the valve housing according to the disclosure is described in further detail based on a second exemplary embodiment (FIGS. 13-21). Unless described otherwise, the valve housing 1 according to the second exemplary embodiment comprises the same technical features as the valve housing 1 according to the first exemplary embodiment. Identical technical features bear the same reference numerals.

Additionally, the technical features of the two exemplary embodiments can be combined as desired with one another, insofar as technically possible and sensible.

Figure 16:
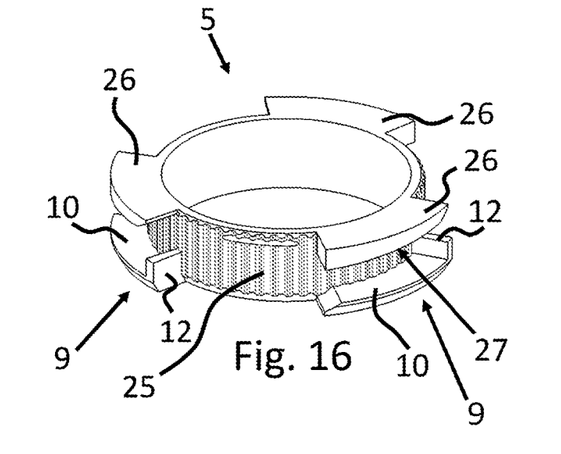
FIG. 16 illustrates a perspective view of a base element of the valve housing.
Figure 17:
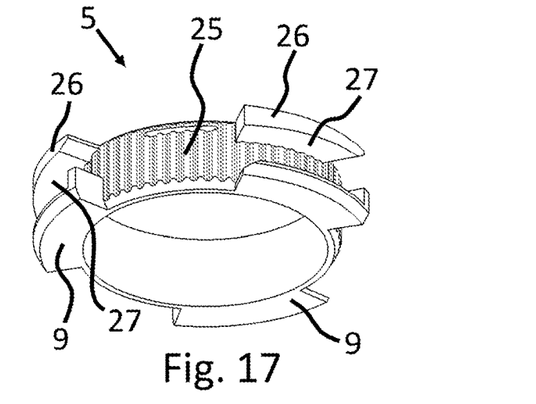
FIG. 17 illustrates a further perspective view of the base element of the valve housing.

The base element 5 according to the second exemplary embodiment comprises the same bayonet-like fastening means 9 with retaining means 10 and rotation-limiting stops 12.

A knurling 25 is integrally configured on the outer sheath wall 7 of the base element 5. This knurling 25 forms a frictional resistance contour in order to generate a frictional resistance in the direction of rotation between the base element 5 and the rotary element 6.

Three first ramp elements 26 are integrally configured radially and equally spaced from one another on a region of the base element which is opposite to the bayonet-like fastening means 9 in the axial direction 11. These first ramp elements 26 have a ramp surface 27 rising in the direction of rotation.

The first ramp elements 26 are arranged in an axial direction 11 so as to be flush or congruent with the bayonet-like fastening means 9.

Figure 14:
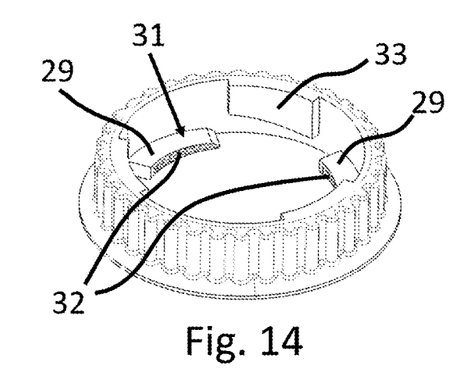
FIG. 14 illustrates a perspective view of a rotary element of the valve housing.
Figure 15:
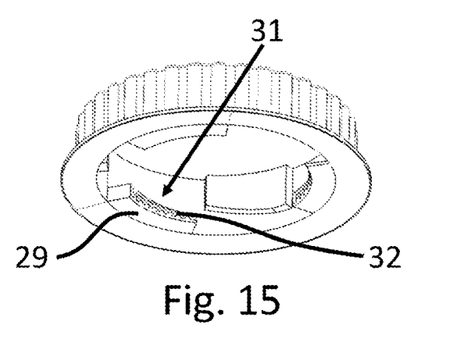
FIG. 15 illustrates a further perspective view of the rotary element of the valve housing.

Second ramp elements 29 configured on an inner sheath wall 28 of the lid element 6 are integrally configured so as to correspond to the first ramp elements 26 of the base element. The second ramp elements 29 also have ramp surfaces 31 rising in the direction of rotation 30.

The first ramp surfaces 27 of the first ramp elements 26 are configured so as to correspond to the second ramp surfaces 31 of the second ramp elements 29.

Furthermore, a knurling 32 is also configured on a radially-inwardly facing surface of the second ramp elements 29, which also forms a frictional resistance contour.

Ramp-like stop elements 33 are integrally configured on a region opposite the second ramp elements 29 of the inner sheath walls 28 of the lid element. A surface extending orthogonally to the axial direction 11 of the ramp-like stop elements 33 together with a surface extending orthogonally to the axial direction 11 of the first ramp elements 26 of the base element 5 forms an axial stop device 34.

The ramp-like stop elements 33 of the rotary element 6 have ramps facing in the assembly direction to provide a clearance for movement of the base element when screwing the valve housing tight. When loosening the valve housing, the ramps serve as a disassembly aid for pushing the base element out of the component in the axial direction or in the assembly direction.

The ramp-like stop elements 33 are offset in the axial direction or are arranged so as to alternate with the second ramp elements 29.

In the following, a method according to the disclosure for connecting the valve housing according to the disclosure according to a second exemplary embodiment to a component 2 is described.

Figure 18:
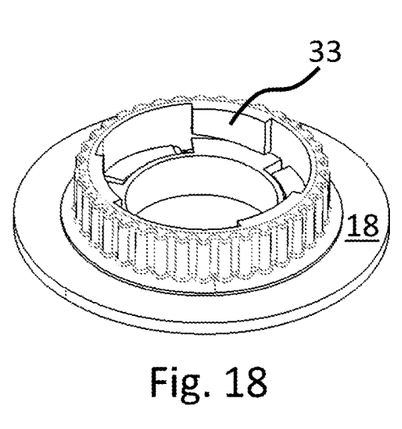
FIG. 18 illustrates a perspective view of the valve housing with a component or a housing device in a non-assembled state.
Figure 20:
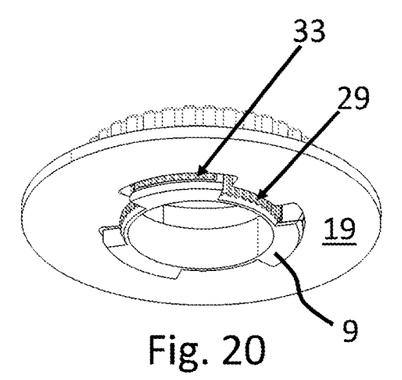
FIG. 20 illustrates a further perspective view of the valve housing from FIG. 18.

First, the valve housing 1 is inserted into the contoured passage 2 of the component via the base element 5 such that the bayonet-like fastening means 9 and the first ramp elements 26 are arranged in the region between the contour elements 4 of the contoured passage 3 of the component 2.

Then, the rotary element 6 is rotated in a rotational direction 30 about the axial axis 24 or is subjected to a corresponding rotational movement.

The retaining means 10 of the bayonet-like fastening means 9 rearwardly engage with the contour elements 4 of the contoured passage opening until the rotation-limiting stops 12 hit the contour elements 4.

Thereafter, the base element 5 no longer moves in the direction of rotation, however, the rotary element 6 is still subjected to a rotational movement. The first ramp surfaces 27 of the first ramp elements 26 of the base element then slide along the second ramp surfaces 31 of the second ramp elements 29 of the rotary element.

Figure 19:
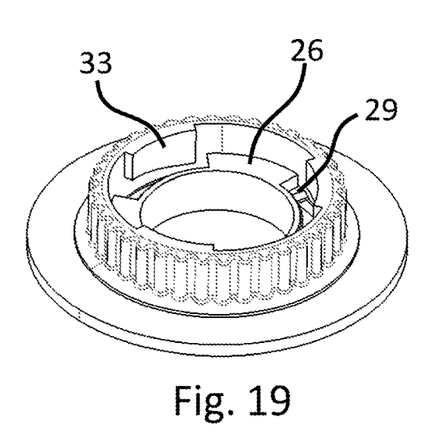
FIG. 19 illustrates a perspective view of the valve housing in a state of being mounted on a component or a housing device.
Figure 21:
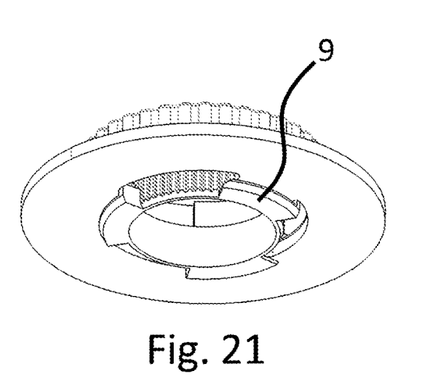
FIG. 21 illustrates a further perspective view of the valve housing from FIG. 19.

Due to the fact that both the first ramp surfaces 27 and the second ramp surfaces 31 are configured so as to rise in the direction of rotation, the base element 5 and the rotary element 6 are moved towards one another in the axial direction 11 until the abutting portion 17 of the abutting means 16 of the rotary element retentively abuts the second component surface 18.

Due to the frictional resistance contours of the base element 5 and the rotary element 6 or the corresponding knurlings 25 and 32, the rotary element can rotate the base element 5 along in the direction of rotation 30 at the beginning of the fastening process.

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Valve housing
2 Housing device
3 Contoured passage opening

4 Contour element
5 Base element
6 Rotary element
7 Outer sheath wall of the base element
8 First fastening portion
9 Bayonet-like fastening means
10 Retaining means
11 Axial direction
12 Rotation-limiting stop
13 Outer thread
14 Tubular portion
15 Inner thread
16 Abutting means
17 Abutting portion
18 Second component surface
19 First component surface
20 Second fastening portion
21 Annular portion
22 Conically tapering insertion portion
23 Assembly direction
24 Axial axis
25 Knurling
26 First ramp elements
27 First ramp surface
28 Inner sheath wall of the lid element
29 Second ramp elements
30 Direction of rotation
31 Second ramp surface
32 Knurling
33 Ramp-like stop elements
34 Axial stop device
35 Valve apparatus
36 Pressure compensation opening
37 Flange portion
38 Sealing portion
39 Struts
40 Tubular portion
41 First pressure compensation valve
42 Second pressure compensation valve
43 Receiving recess
44 Housing side
45 Covering side
46 Second membrane device
47 Water drain
48 Passage opening
49 First membrane device
50 Second membrane device
51 Ceiling wall
52 Side wall
53 Bottom wall

What is claimed is:

1. A valve housing comprising:
a base element for insertion into a passage opening of a component, wherein the base element comprises a first fastening portion, in which at least one bayonet fastener is configured for retentive abutment on an edge region of a first component surface of the component,
wherein the base element internally comprises a radially circumferential flange portion that forms a sealing portion for a first membrane device, and wherein radially inwardly extending struts are molded on the flange portion forming in a center a receiving element for receiving a portion of the first membrane device; and
a rotary element arranged on the base element, having a second fastening portion, in which an abutment surface for retentive abutment on a second component surface of the component is configured,
wherein the base element and the rotary element are rotatably and axially slidably coupled to one another via a threaded axial displacement device, and are configured to limit a valve opening, and
wherein the rotary element comprises an internal tubular portion with a second membrane device.

2. The valve housing according to claim 1,
wherein the bayonet fastener of the base element comprises one or more radially and circumferentially arranged retainers for retentive abutment on contour elements of a first component surface of the component,
wherein the base element comprises one or more rotation-limiting stops extending in an axial direction, which cooperate with a contour element of a component such that a predetermined rotational movement of the base element is limited, and
wherein the base element and the rotary element thereafter move together in the axial direction for retentive abutment.

3. The valve housing (1) according to claim 1,
wherein the threaded axial displacement device comprises an external thread of the base element and an internal thread of the rotary element engaged with the external thread of the base element to form a threaded connection,
wherein said threaded connection generates frictional resistance,
wherein the threaded axial displacement device comprises first ramp elements of the base element and correspondingly configured second ramp elements of the rotary element, and
wherein frictional resistance contours are provided between the base element and the rotary element in order to generate the frictional resistance.

4. The valve housing according to claim 1,
wherein the valve housing is a universal valve housing suitable for receiving various membranes or closure bodies and configured so as to form different valves.

5. A valve apparatus comprising:
a valve having a first valve housing with a housing side and a covering side, including:
a first, gas-tight, membrane device covering a first pressure compensation opening of the first valve housing and releasing the first pressure compensation opening from a predetermined negative pressure prevailing on the housing side in order to enable a pressure compensation between a housing device and an environment; and
a water-impermeable second membrane device arranged on the covering side and in series to the first, gas-tight, membrane device, covering a second pressure compensation opening of the first valve housing and preventing water entry into the first valve housing and thus into the housing device;
a pressure relief valve having a second valve housing with a housing side and a covering side, including a third, gas-tight and watertight membrane device covering a pressure compensation opening and releasing the pressure compensation opening at a predetermined positive pressure prevailing on the housing side in order to reduce a positive pressure prevailing on the housing side in the housing device,
wherein the first valve housing and second valve housing are substantially identical in their construction, with the exception of the first, gas-tight, membrane device, the water-impermeable second membrane device, and the third, gas-tight and watertight membrane device.

6. The valve apparatus according to claim 5, wherein the housing device comprises:
- a bottom wall, extending approximately horizontally, in which the pressure relief valve is arranged in a lowest region of the bottom wall;
- a ceiling wall extending in a horizontal direction; and
- at least one side wall extending in a vertical direction and joining the bottom wall with the ceiling wall,
  - wherein the pressure compensation valve is arranged in the side wall and thus offset by 90° to the pressure relief valve.

7. The valve apparatus according to claim 5, wherein the housing device is configured to house a battery or power electronics.

8. The valve apparatus according to claim 5, wherein the housing device comprises:
- a bottom wall, extending approximately horizontally, in which the pressure relief valve is arranged in a lowest region of the bottom wall;
- a ceiling wall extending in a horizontal direction; and
- at least one side wall extending in a vertical direction and joining the bottom wall with the ceiling wall,
  - wherein the pressure compensation valve is arranged in the ceiling wall and thus offset by 180° to the pressure relief valve.

9. A valve housing comprising:
- a base element for insertion into a passage opening of a component,
  - wherein the base element comprises
    - a bayonet fastener configured to mechanically engage the component, and
    - a radially circumferential flange portion with a sealing portion configured to seal with a first membrane device; and
- a rotary element coupled to the base element,
  - wherein the base element and the rotary element are coupled to one another rotatably and axially slidably via an axial displacement device to limit a valve opening, and
  - wherein the rotary element comprises
    - an abutment surface configured to abut a component surface of the component, and
    - an internal tubular portion having a second membrane device.

10. The valve housing according to claim 9, wherein the radially circumferential flange portion comprises a plurality of radially inwardly extending struts that converge at a center to define a receiving element configured to receive a portion of the first membrane device.

11. The valve housing according to claim 9, wherein the valve housing is a universal valve housing suitable for receiving various membranes or closure bodies and configured so as to form different valves.

12. The valve housing according to claim 9, wherein the first membrane device comprises silicone and the second membrane device comprises polytetrafluoroethylene (PTFE).

13. The valve housing according to claim 9, wherein the axial displacement device comprises an external thread of the base element and an internal thread of the rotary element engaged with the external thread of the base element to form a threaded connection.

14. The valve housing according to claim 13, wherein said threaded connection generates frictional resistance.

15. The valve housing according to claim 13, wherein the axial displacement device comprises first ramp elements of the base element and correspondingly configured second ramp elements of the rotary element.

16. The valve housing according to claim 13, wherein frictional resistance contours are provided between the base element and the rotary element in order to generate frictional resistance.

17. The valve housing according to claim 9, wherein the bayonet fastener of the base element comprises a plurality of radially and circumferentially arranged retainers for retentive abutment on contour elements of a first component surface of the component.

18. The valve housing according to claim 17, wherein the base element comprises one or more rotation-limiting stops extending in an axial direction that cooperate with a contour element of a component such that a predetermined rotational movement of the base element is limited.

19. The valve housing according to claim 18, wherein the base element and the rotary element are configured to move together in the axial direction for retentive abutment.

\* \* \* \* \*